(12) United States Patent
Mankoff (10) Patent No.: US 6,868,426 B1
(45) Date of Patent: Mar. 15, 2005

(54) VIRTUAL DOCUMENT ORGANIZER SYSTEM AND METHOD

(76) Inventor: Jeffrey W. Mankoff, 5330 Pebble Brook, Dallas, TX (US) 75229

( * ) Notice: Subject to any disclaimer, the term of this patent is extended or adjusted under 35 U.S.C. 154(b) by 245 days.

(21) Appl. No.: 09/611,672

(22) Filed: Jul. 7, 2000

Related U.S. Application Data (60) Provisional application No. 60/191,352, filed on Mar. 22, 2000, and provisional application No. 60/142,611, filed on Jul. 7, 1999.

(51) Int. Cl.[7] .............................................. G06F 17/30
(52) U.S. Cl. ...................................... 707/104.1; 705/14
(58) Field of Search ........................... 707/104.1, 1, 10, 707/104; 705/14, 7, 10, 16, 26; 725/4, 23

(56) References Cited

U.S. PATENT DOCUMENTS

| | | | |
|---|---|---|---|
| 4,010,964 A | 3/1977 | Schechter | |
| 4,097,067 A | 6/1978 | Schechter | |
| 4,882,675 A | 11/1989 | Nichtberger et al. | |
| 5,249,044 A | 9/1993 | Von Kohorn | |
| 5,305,197 A | 4/1994 | Axler et al. | |
| RE34,915 E | 4/1995 | Nichtberger et al. | |
| 5,734,823 A | 3/1998 | Saigh et al. | |
| 5,773,954 A | 6/1998 | Van Horn | |
| 5,806,044 A | 9/1998 | Powell | |
| 5,821,513 A | 10/1998 | O'Hagan et al. | |
| 5,855,007 A * | 12/1998 | Jovicic et al. ................. | 705/14 |
| 5,948,061 A | 9/1999 | Merriman et al. | |
| 5,970,469 A | 10/1999 | Scroggie et al. | |
| 5,992,888 A | 11/1999 | North et al. | |
| 6,009,410 A | 12/1999 | LeMole et al. | |
| 6,014,634 A | 1/2000 | Scroggie et al. | |
| 6,026,369 A | 2/2000 | Capek | |
| 6,041,309 A * | 3/2000 | Laor ............................ | 705/14 |
| 6,049,779 A | 4/2000 | Berkson | |
| 6,092,090 A * | 7/2000 | Payne et al. ................. | 715/530 |
| 6,101,485 A * | 8/2000 | Fortenberry et al. .......... | 705/27 |
| 6,292,785 B1 * | 9/2001 | McEvoy et al. .............. | 705/14 |
| 6,321,208 B1 | 11/2001 | Barnett et al. | |
| 6,330,543 B1 * | 12/2001 | Kepecs ......................... | 705/14 |
| 6,336,098 B1 | 1/2002 | Fortenberry et al. | |
| 6,336,099 B1 * | 1/2002 | Barnett et al. ................. | 705/14 |
| 6,356,905 B1 * | 3/2002 | Gershman et al. ............ | 707/10 |
| 6,385,591 B1 * | 5/2002 | Mankoff ....................... | 705/14 |
| 6,424,950 B1 | 7/2002 | Weller | |
| 6,584,448 B1 | 6/2003 | Laor | |
| 2002/0010623 A1 | 1/2002 | McCollom et al. | |

FOREIGN PATENT DOCUMENTS

| | | |
|---|---|---|
| CN | 1357129 A | 7/2002 |
| JP | 7-327094 | 12/1995 |
| WO | WO 9926176 A1 | 5/1999 |
| WO | WO 0816552 A1 | 11/2001 |

OTHER PUBLICATIONS

Sharon Machlis, "Web coupons clipping costs for consumers", Jul. 8, 1998, pp 1–3.*

(List continued on next page.)

*Primary Examiner*—Uyen Le
*Assistant Examiner*—Hanh Thai
(74) *Attorney, Agent, or Firm*—Baker & McKenzie

(57) ABSTRACT

A system and method of managing virtual documents is described. In this approach, a user database is set up on a network-connected computer. There are a number of virtual documents that are created by on other network-connected computers. These virtual documents have associated with them an attribute file having known header and field information. The virtual documents and their associated attribute files are sent from the other network-connected computers to the network-connected computer, which then categorizes and stores information from the virtual documents according to the contents of the attribute file.

20 Claims, 8 Drawing Sheets

OTHER PUBLICATIONS

U.S. Appl. No. 09/309,989, filed May 11, 1999, Mankoff.
vCard: The Electronic Business Card, Jan. 1, 1997, Internet Mail Consortium, pp 1–5.
vCalendar: The Personal Calendaring and Scheduling Exchange Format, Jan 1, 1997, Internet Mail Consortium, pp. 1–5.
CNN—The Web–coupon craze continues, Tom Diederich, Feb. 19, 1999, pp. 1–3.
AOL says, 'You've got coupons,' CNBC & The Wall Street Journal Business, pp. 1–4.
Don't Look on Web For Good Calendar, The Wall Street Journal Interactive Edition, pp. 1–6.
Smartmoney.com: Sticky–Fingered Web Sites, Dow Jones Newswire, Mar. 4, 1999, pp. 1–3.
High–Tech Rivals Are Battling To Make Their Web Sites 'Sticky' Feb. 11, 1999, George Anders, pp. 1–3.

* cited by examiner

VIRTUAL DOCUMENT ORGANIZER SYSTEM AND METHOD

RELATED APPLICATIONS

This application claims priority from the following and commonly-assigned utility and provisional patent applications:

| Application No. | Filing Date |
| --- | --- |
| 60/142,611 | Jul. 7, 1999 |
| 60/191,352 | Mar. 22, 2000 |

The above applications are hereby incorporated by reference herein.

TECHNICAL BACKGROUND

A typical kitchen drawer might include, for example, merchant coupons, product warranties, sales receipts, product instructions, service instructions, rebates, gift certificates, product registration cards, event tickets, credit card statements, bank statements, and recipes. Collectively, we can refer to a general class of these types of documents as "retail collateral." Paper documents are cumbersome and hard to organize.

Increasingly, retail collateral documents are sent to users electronically. Like paper documents, organizing virtual documents is cumbersome and hard to organize, as evidenced by most users email inbox. Today's electronic organizers and contact managers are most-commonly associated with the individual user, and are maintained at the user's Personal Computer ("PC"), Personal Digital Assistant ("PDA"), or at the user's workplace on the Local Application Server ("LAS"). These organizers and contact managers are for managing the users' schedule, electronic-mail messages, and database of professional and personal contacts. Although a user can manually set up folders in which to transfer email messages from the inbox, given the volumes of messages a typical user receives between commercial and personal emails, the typical user's inbox becomes much like the cluttered kitchen drawer. Accordingly, these organizers and contact managers are not well-suited to maintaining retail collateral documents of the type listed above, because such important documents will typically become lost in the "fog" of the cluttered inbox.

SUMMARY OF THE EMBODIMENTS

Described is a system and method for distributing, collecting, and organizing Virtual Retail Collateral Documents ("VRCDs"), including virtual documents like merchant coupons, product warranties, sales confirmations and receipts, product instructions, service instructions, rebates, gift certificates, product registration cards, event tickets, credit card statements, bank statements, internet sites user names and passwords, and recipes. These VRCDs may be delivered to an Internet user or other network user via email, banner ads, interactive television, digital phones, or other digital method, thus further adding to the organizational challenge for the consumer.

The application described below addresses these challenges through a web-based, electronic document management system that organizes and integrates VRCDs on an Internet-connected computer. As discussed below, this web-based electronic document management system can be accessed via handheld/PDA device or a personal computer-like appliance. Preferably, the system and method described below organizes the VRCDs alongside the consumer's personal information and integrates the VRCDs with that personal information.

The application described here addresses the converging needs of consumers, Internet-connected merchants, and content providers (e.g. Yahoo, Excite and other portals). Consumers like discounts and coupons, organization, convenience, and ease of use, but need a tool to organize, archive and consolidate VRCDs; advertisers need to personalize and target their messages in order to get their message through to the—overloaded consumers; content providers need to enhance "stickiness" to maximize revenues from the sale of their mailing lists and banner ads. The described system and method addresses the needs of these disparate groups. In particular, the described system and method facilitates and enables the advertiser/merchant's message to get through to the consumer, by automatically organizing the VRCDs for the consumer for later convenient and easy access by the user.

Preferably, the integrated, Internet- or Web-based organizer will become an all-important homepage for the consumer/user when connecting to the Internet, interactive television, mobile phones or other modern networks. This integrated homepage, comprising both virtual documents and the user's personal data, will serve as the user's integrated Personal Information Manager ("i-PIM") containing all the user's personal data, integrated with the VRCDs. The I-PIM will preferably be capable of synchronization with or direct access by users' mobile devices, such as PDAs and cell phones. Preferably, the system and method will also be integrated with the user/consumer's calendaring system, so that the user/consumer will be able to reference in one place his contacts and calendar as well as receipts, instructions, bank and credit card statements and anything else the consumer might want to organize.

The process preferably begins with the user receiving a VRCD with an organizing button (henceforth VRC organizing button) in the form of an email or by clicking a VRCD containing a VRC organizing button enabled banner ad for the first time. This will prompt the user to register with an entity which will maintain or host the web-based VRCD organizer. At an Internet-computer, the host will preferably establish an individual database. The individual database or user database will preferably be a record within a larger database. The user database, and preferably the other records within the larger database, will each contain a number of categories within which to store information from the VRCDs requested by the consumer/user. It is also possible that the consumer/user may not specifically request the VRCDs be sent to the VRCD database host, but alternatively such VRCDs may be automatically selected for the user based on a user-established profile.

To facilitate the categorization and storage of VRCD information, attribute files are preferably associated with each of such VRCDs. These attribute files would preferably have defined fields and header information which would be provided to a merchant or service provider, for example, who would attach or associate the attribute file with the VRCD sent to the user or to the VRCD database host on the user's behalf. The merchant or service provider would preferably attach the attribute file to the VRCD, which would then be sent to the user or the users' individual database at the entity's website, through one of many different channels. Once these VRCDs are sent for storage to the host of the VRCD web-based organizer, the host will then know from the attribute file how to categorize or classify the information from that VRCD. In other words, the merchant or service provider provides the VRCD along with an attribute file, which allows the host of the web-based organizer to automatically categorize a user's VRCDs.

The attribute file can contain useful information associated with a VRCD. Information contained within the attribute file might include a merchant ID, merchant class, web site URL, merchant address, map, and email information. More preferably, a merchant ID and promotion ID might be the only information contained in the attribute file, and the other merchant characteristics would preferably be stored and associated with that vendor at the VRCD database web host.

Although the user database at the Internet-connected host computer would preferably be associated with an individual Internet user/consumer, such databases could be assigned alternatively to groups of affiliated user/consumers, such as businesses or charitable or civic organizations.

First-time registration could be direct with the host or administrator of the VRCD database computer, or it could be through an affiliated Internet-connected merchant or other site. The user/consumer would preferably use an existing email address or be assigned a new email address that might be used exclusively for receipt and request of commercial, e.g., bulk or targeted, virtual documents. Typically, users have more than one email address, and consequently users receive VRCDs via different email addresses. The user can provide these different email addresses at registration to the VRCD entity, so that when the VRCD is forwarded from any of the user's email addresses to the VRDC entity, the system can recognize it and organize them with the single user. Often times, users set up multiple email addresses in order to receive multiple coupons, which typically are offered only to a single email address. This embodied system has the benefit of recognizing that more than one offer has entered the VRCD organizer, and block duplication of offers in the same VRCD organizer per user.

In the instance of commercial solicitations through bulk or targeted emails containing embedded VRCDs, the VRCD database host or administrator would preferably provide a merchant, who has received opt-in authorization from the consumer, proprietary header and field format information for the attribute file to be associated with the VRCD; the VRCD would then be embedded in the email or banner ad solicitation. The embedded VRCD preferably contains a VRCD organizer button, which the consumer would click, and the VRCD would be transmitted through the network to the VRCD database host. The information from the VRCD would then be placed in the appropriate portion of the user database based on the information in the VRCD's affiliated attribute file. Once information from such VRCDs are in the user database, the user/consumer who is the "owner" of that database can conveniently access that information at any time. By this technique, the advertiser can distribute a coupon VRCD via mass email or banner ad.

Depending on how the system is configured, VRCDs can be sent directly to the VRCD database host for filtration and storage in the user database, or they can be sent to the user for discretionary forwarding to the VRCD database host. In either case, upon reaching the VRCD database, the VRCD is sorted by category, and information from the VRCD is stored as a new record with defined portions of the VRCD being stripped from the overall file and placed in the corresponding record fields of the user database. The fields culled from the VRCD and placed in the database preferably include such things as hyperlinks for the merchant home site, in the instance of promotional offers, hyperlinks to the merchant offer page, offer details, merchant addresses and phone numbers, pertinent dates, and the like.

If the VRCD is associated with a banner ad, the consumer would click the VRCD organizer button in the coupon banner ad, and the VRCD would be transmitted through the network and placed in the appropriate portion of the user database. Once information from such VRCDs are in the user database, the user/consumer who is the "owner" of that database can then conveniently access that information at any time. Banner ad click-through rates have declined substantially. The rates that destinations sites can charge have declined as a result. Moreover, banner ads often take the user away from the destination site to the advertiser, reducing stickiness. For the consumer, it may not be convenient to click the banner ad to click through and claim the offer, even though he wants it. By providing a system which provides convenience for the user to click the banner ad and claim the offer and organize the offer in his personal VRCD organizer for later redemption with the merchant, while staying at the destination site, the three parties, consumer, merchant, and destination site benefit. The user can claim the offer at a later convenient time; the merchant can make another sale; and the destination site can charge more for its banner ad space.

The described technology facilitates more than traditional e-commerce applications. For instance the described system and method would allow manufacturers or service providers to provide click-links for virtual-document product or service information or virtual-document warranties at their homepages. For example, a user might purchase a portable music player and register with the manufacturer. The manufacturer would then send via email to the user a "thank you" for registering in the form of the VRCD system, which could then be organized in the user's VRCD web-based organizer under instructions/warranties, and provide in list format a summary of the name of the manufacturer with hyperlink, a hyperlink to particular product instructions, a hyperlink to product warranty information at the manufacturer's website, an expiration date of product warranty, a customer care telephone number, and an email contact. The virtual-document instructions and warranty could then be viewed within the user's i-PIM.

In some instances, one of the fields of the received VRCD may be a hyperlink for a merchant or service provider with whom the user has an account. In this instance, it may also be preferable to include fields for the user and password for accessing the particular hyperlinked site. Using this approach, it may be possible to directly access the merchant or service provider website from the user's personal VRCD database screen by transmitting the username and password automatically to the hyperlinked site when the user clicks on that hyperlink or otherwise attempts to reach that website from within his personal VRD database screen.

The VRCD organizer can be applied to any medium for delivery of electronic documents. For example, interactive TV and web-enabled phones are channels by which these virtual documents may be delivered to consumers. Further, the "i-PIM" VRCD organizer can be accessed through any of these channels as well—specifically, the Internet, interactive TV, web-enabled phones, and web-enabled PDAs are all different means by which users can access their web-based VRCD organizers or i-PIMs. Thus, with portable handheld devices, the consumer's VRCD can be accessed anytime, anywhere. If the consumer needs to check his bank statement or instructions, he need only use his web-enabled PDA to access this VRCD.

The above summary has outlined the embodiments described in this application, but this description is only to be used in the context of the entire specification to illustrate some of the major features of these embodiments. Accordingly, other features and a fuller understanding of these embodiments may be had by referring to the entire specification. None of these embodiments are limiting of the scope of the invention, which must be determined by the claims set forth in the claims section.

DETAILED DESCRIPTION OF THE EMBODIMENTS

System Architecture

Figure 1:
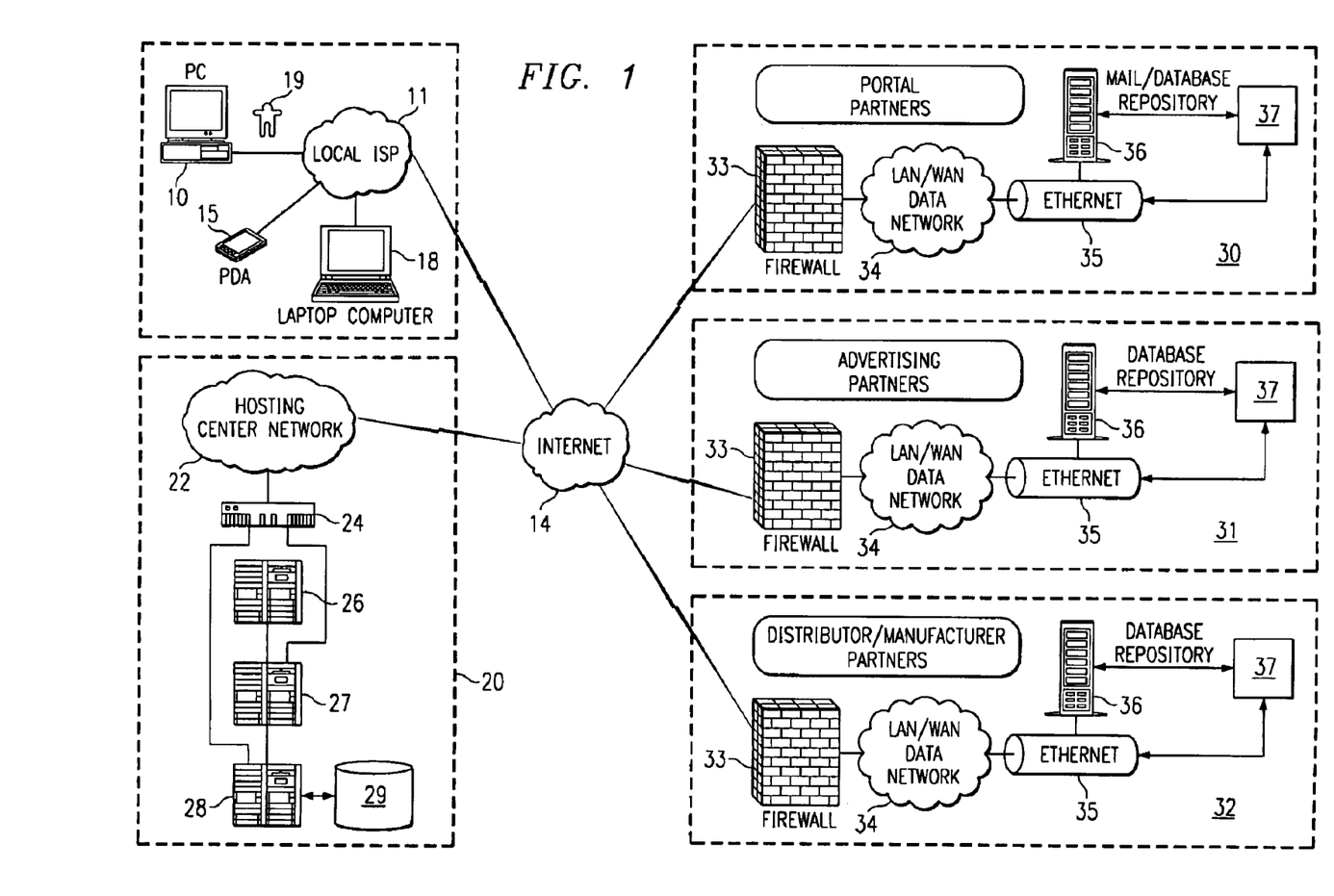
FIG. 1 is a block diagram of the a network upon which the embodiments of the Virtual Retail Collateral Document ("VRCD") organizer can be implemented.

FIG. 1 illustrates an Internet client-server system upon which the Virtual Retail Collateral Document (VRCD) organizer system and method can be implemented. In this block diagram, a client machine 10 is provided, which is preferably a Personal Computer (PC), but could also be a Personal Digital Assistant (PDA) 15 or laptop 18. An Internet browser application is preferably provided on the client machine 10, 15, 18. The client machine, operated by user 19, then connects to the VRCD database host 20 through the network 14, preferably the Internet, typically through a local Internet Service Provider (ISP) 11.

Within the VRCD database host 20, a local network 22 is provided along with a router 24. The Internet browser application in the client typically communicates with the VRCD database host 20 through a web server 26, which may be a separate computer within the database host 20, or may be an application running within a single computer comprising the database host 20. In the applications described below, the VRCD database host 20 preferably comprises a web server and its associated software components, including: the web-server operating system (e.g., Windows, Linux, AIX); an IIS server used to deliver HTML and ASP content and applications to the client web browser; a site server used primarily to deliver personalized web content to users, an index server for indexing web content and providing users with website-specific search and query results; web publishing server extensions for deploying and publishing web content and applications from the development and test environments; site monitoring and management tools for monitoring traffic and content on the website; and components for XML parsing. Also included in the VRCD database hosting environment would be an application server 27, a database server 28, and a database 29 associated with the database server. The application server 27 would preferably provide application component communication either internally or externally to partner-based applications and or FTP transfer functionality.

Figure 2:
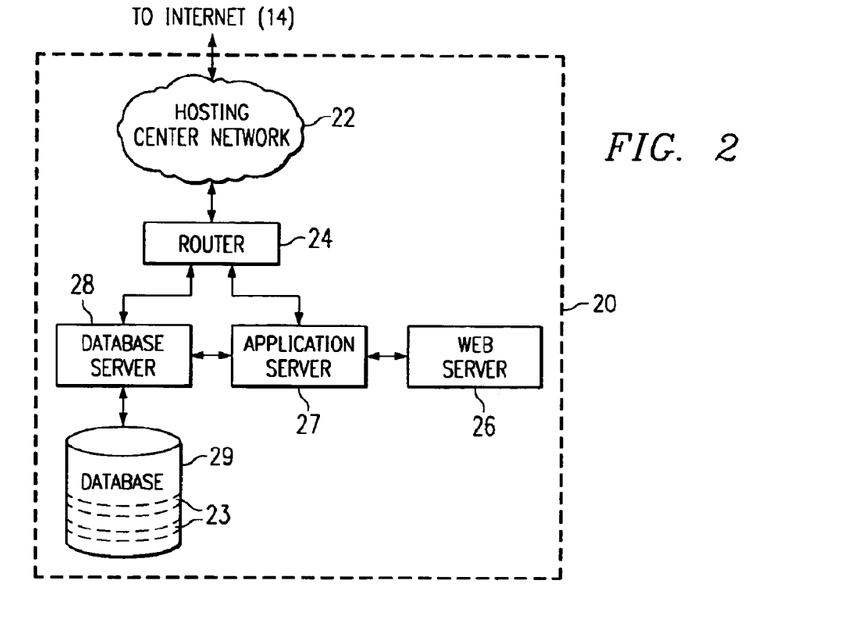
FIG. 2 is a block diagram of an embodiment of the host environment for the VRCD organizer, for storing VRCDs in a user's individual database.

As shown in FIG. 1 and in greater detail in FIG. 2, the database server 28 would preferably store and retrieve data elements to and from its associated database 29, including the user databases 23 which are provided within the overall database 29.

Referring again to FIG. 1, also connected to the network 14 are several exemplary partner sites for the Virtual Retail Collateral Document (VRDC) host administrator or server. These exemplary partner sites include a portal partner site 30, an advertising partner site 31, and a distributor/manufacturer partner site 32. These partner sites would in general comprise similar functional blocks, which would include a firewall 33, a LAN/WAN data network 34, an Ethernet 35, a database repository 36, and their own web servers 37. With these components, the partners would preferably have their own Internet connectivity accessible to at least the VRCD database host 20 and preferably also to the users 19.

A portal partner 30 would preferably be a common user destination for searching, directories, and other information. Users 19 will preferably enter the portal, and in embodiments described herein would find commercial content of interest to the user. This content might be available to the user through virtual documents, such as merchant coupons, product warranties, sales receipts, product instructions, service instructions, rebates, gift certificates, product registration cards, event tickets, credit card statements, bank statements, and recipes. These virtual documents are referred to generically in this application as VRCDs, and the VRCD database host 20 will organize these VRCDs for the user according to methods described below. In some instances, the user 19 will access the database host 20 directly through a connection between the user's client computer 10, 15, 18 and the host's web server 26. But given that many portals maintain personal information for users of their sites, it may be preferable that the VRCD database host 20 operate as an application within the portal site 30, such that the VRCDs stored for the user might actually appear to be stored within a portal application itself.

The advertising partners' sites 31 might provide banner ads to many different destinations on the Internet or other electronic network. Clickable VRCDs might be embedded in these banner ads the VRCDs, such that the VRCDs would preferably be delivered to the VRCD database host 20 in response to a user 19 clicking on one of these banner ads.

The VRCD would preferably be provided to the VRCD database host 20 through the electronic network 14 and would be placed in the appropriate portion of the user database 23 according to an attribute file associated with the VRCD.

Still referring to advertising partner sites 31, in the instance of commercial solicitations through bulk or targeted emails, the VRCD database host or administrator 20 would preferably provide the advertiser site 31, who has received opt-in authorization from the consumer 19 or fits within the consumer's profile, a proprietary identification code to be embedded in the email solicitation. The advertiser can then send the standard coupon via mass email or banner ad. Depending on how the system is configured, the VRCD could be sent directly to the VRCD database host 20 for filtration and storage in the user database 23, or it could be sent to the user 19 for discretionary forwarding to the VRCD database host 20.

The approach with the merchant/distributor site can follow any of the approaches described above with respect to the portal partner site 30 and the advertiser partner site 31. In fact, any of the above approaches could be adapted for any type of web-connected partner according to that partner's unique needs. Applications other than traditional e-commerce applications can be facilitated by this system and method. For example manufacturers/distributors/service providers could provide click-links for virtual-document product or service information or virtual-document warranties at their homepages 32. These virtual documents such as product or service information or warranties could be transmitted to the user's i-PIM at the database host 20, where they could be viewed at the user's convenience.

In any of the above instances, upon reaching the VRCD database 29, the various field information will be stripped from the VRCD and sorted by category according to the attributes stored in the attribute file 40 (not shown, see FIG. 4) associated with the VRCD 41 (not shown, see FIG. 4), and automatically placed in the appropriate portion of the user database 23.

VRCD Organization Method

Figure 3:
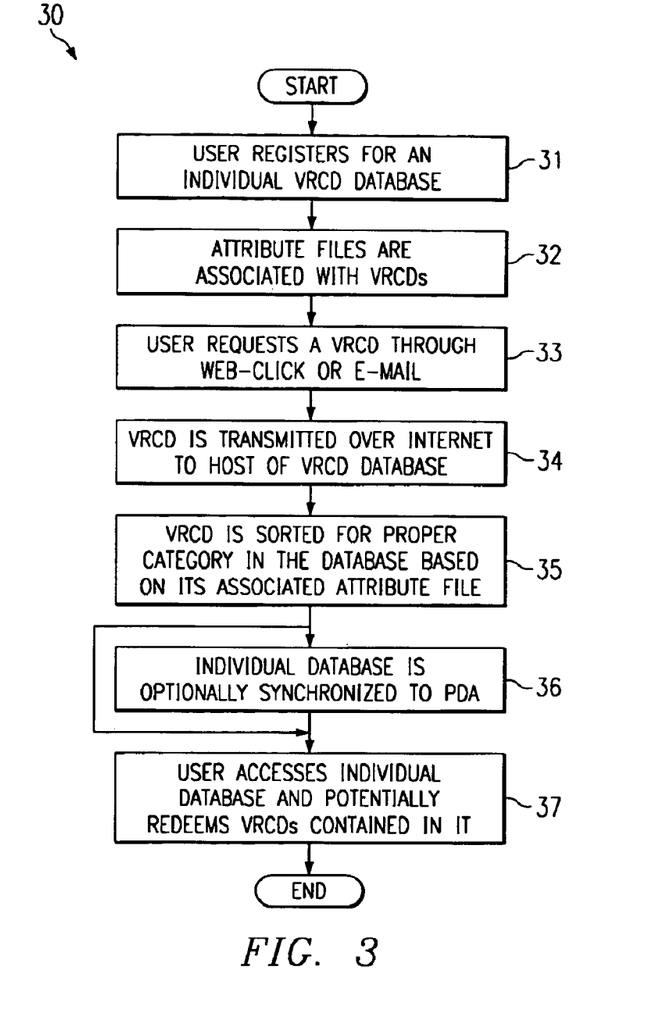
FIG. 3 is a flow diagram for a method by which VRCDs can be organized and distributed.

This method is described in greater detail in the flowchart of FIG. 3. As described in this figure, with reference still to FIGS. 1–2, the process 30 preferably begins with the user registering 31 with an entity that will maintain or host the web-based VRCD organizer. First-time registration could be direct with the host 20 of the VRCD database computer, or it could be through an affiliated Internet-connected merchant or other site 30, 31, 32.

The user/consumer 19 would preferably use an existing email address or be assigned a new email address that might be used exclusively for receipt and request of commercial, e.g., bulk or targeted, emails. Because users often have more than one email address, in the application described here users often would receive VRCDs via their different email addresses. The user can provide these different email addresses at registration to the VRCD entity, so that when the VRCD is forwarded from any of the user's email addresses to the VRDC entity, the system can recognize it and organize them with the single user. Often times, users set up multiple email addresses in order to receive multiple coupons, which typically are offered only to a single email address. This embodied system has the benefit of recognizing that more than one offer has entered the VRCD organizer, and can thus block duplication of offers in the same VRCD organizer per user. At functional block 32, the VRCD database host 20 through the database server 28 preferably establishes a user database 23 within the database 29. The user database 23 will preferably comprise a record within a larger database 29. The user database 23, and preferably the other records within the larger database, will each contain a number of categories within which VRCDs requested by the consumer/user can be stored. It is also possible that the consumer/user may not specifically request the VRCDs to be stored within the user database 23, but alternatively such VRCDs may be selected based on a profile associated with that user/consumer 19.

Figure 4:
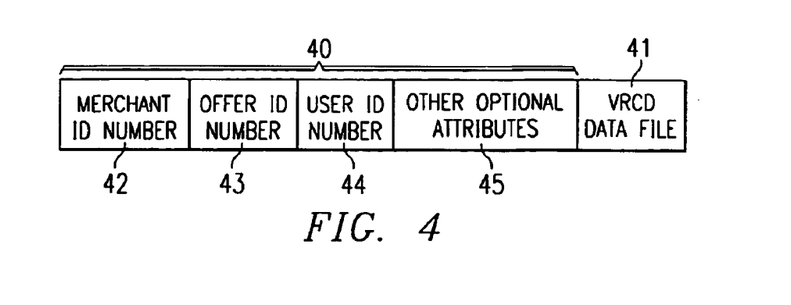
FIG. 4 is a data structure diagram of a VRCD and its affiliated attribute file.

Still referring to FIG. 3 and specifically to block 32, to facilitate the filtering and storage of VRCDs, attribute files are preferable associated with each of such VRCDs. A data structure of how these files could be associated and structured is illustrated in FIG. 4; this data structure is described below. The attribute files (not shown, see FIG. 4), for example, would be provided to the merchant partner 30, 31, 32, who would attach or associate the attribute file with the email sent to the user.

At block 33, a user can request that a VRCD be sent to the host 20 by responding to an email solicitation or clicking on a banner ad or other clickable graphic. If responding to an email solicitation, there would preferably already be an attribute file, which would be attached to the user's email response. The email response could be sent directly to the host 20 or through one of the merchant sites 30, 31, or 32, which could log the "hit" and forward the information on to the host 20. If the user respond by clicking a link, the VRCD would preferably be sent (at block 34) with its affiliated attribute file directly from the applicable merchant site to the host 20.

According to block 35, the host 20 will sort the VRCD according to information in the attribute file and in this same block stored in the appropriate user database 23 of the database 29 according to the filtering and classification by the attribute file information, thereby updating the user's integrated-PIM or "i-PIM." The i-PIM is then available for user access, and the user can optionally synchronize a PDA at block 36 to the PIM or interact directly with the web server 26 of the host 20.

As shown in FIG. 4, information contained within the attribute file 40, which is associated with the VRCD data file 41, might include a merchant ID 42, offer or promotion ID 43, user ID 44, or other attributes 45. Other attributes might include merchant class, web site URL, merchant address, map, and email information, but preferably this additional information could be associated with the particular merchant ID at the host 20, and be integrated into to the i-PIM there.

Again, preferably the VRCDs will include merchant coupons, product warranties, sales receipts, product instructions, service instructions, rebates, gift certificates, product registration cards, event tickets, credit card statements, bank statements, and recipes, and preferably the user database at the Internet-connected host computer would preferably be associated with an individual internet user/consumer, although databases could be assigned alternatively to groups of affiliated user/consumers such as businesses or charitable or civic organizations.

Screen Displays for VRCD Database

Figure 5:
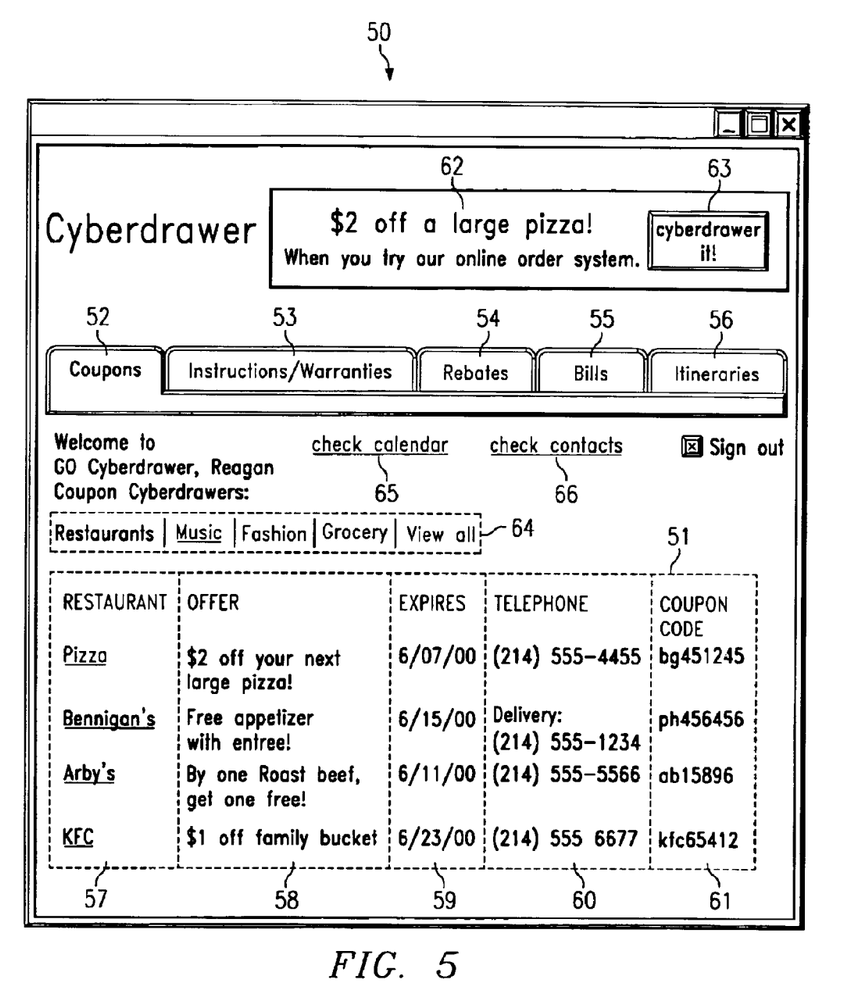
FIG. 5 is a diagram of the "Coupon: Restaurant" portion of the user's individual database as it might appear on the user's client display screen.

Referring now to FIG. 5, virtual coupons or "voupons" are particularly well-suited to organization and collection according to the embodiments described above. As shown in the figure, which is a diagram of the "coupon" portion of the user's individual database 23 as it might appear on the display screen of the user's client PC 10. This particular screen 50 might be accessed directly from the database host web server 26, or it might be transparently integrated within another entity's web site, such as a portal web site 30.

In one preferred approach, the user 19 might have saved the "Pizza" coupon in response to an email solicitation from the pizza restaurant. Under this approach, the pizza restaurant would have emailed the coupon with a promotional ID or coupon ID 43 to the user 19—the coupon ID 43 would preferably have been provided to the merchant by the data base host 20. The user's client could be set up either to automatically register this offer at the individual database 23 or to do so only if Joe "accepts" the offer. Under this application, since the user's individual database 23 is preferably stored on another web-connected site 20, a VCRD 41 is transmitted to the host 20 with an affiliated attribute file 40. If the promotional ID or coupon ID 43 is unique, this would be the only information that would need to be transmitted to the host 20. Alternatively, other attribute information could also be provided to the host 20 such as specific information about the merchant. Preferably, an attribute that uniquely identifies the user is also placed within the attribute file 40 so that the VRCD can be assigned to the appropriate individual user's database 23.

Rather than immediately transferring this information to the host 20, the VRCD may be stored in an organizer associated with the client, and the web-based i-PIN at the host 20 can be updated to include this information upon the next synchronization between the client device and the web host 20.

Still referring to FIG. 5, in this application, there is a proprietary code comprising at least the promotional ID or coupon ID embedded in the mass email to the user that allows the system described herein to translate the email and automatically store it in the "Coupons: Restaurants" section of the user database 23. Upon closer examination of the screen 50 of FIG. 5, it can be seen that the highlighted tab at the top of the screen is the "Coupons" tab 52. Although not showing it in database format, the data within box 51 of FIG. 5 illustrates the data which would be stored in the "Coupons: Restaurants" section of the user database 23.

Other tabs seen at the top of FIG. 5 include an "Instructions/Warranties" tab 53, a "Rebates" tab 54, a "Bills" tab 55, and an "Itineraries" tab 56. This list of categories/tabs is not exhaustive, nor even necessarily fixed. In other words, the database server 28 working with the applications server 26 would preferably operate to define new categories as such new categories arose during use of the system and method described herein.

Convenient information shown on the screen 50, includes the name of the restaurant 57, the offer details 58, the offer expiration date 59, the restaurant telephone no. 60, and the coupon code 61. The coupon code shown here could be the same as or derived from the coupon ID or promotion ID 43 that was associated with the VRCD originally. As previously mentioned, this might have been the only information transmitted to the host 20 by the remote site 30, 31, 32 or the client 10, and the host 20 might have had a database of coupon codes that would tell the host 20 the restaurateur 57, offer details 58, expiration date 59, and restaurant telephone no. 60.

Also seen on FIG. 5 is an exemplary banner ad 62. The pizza restaurant voupon could clipped through a clickable-link or button 63 as shown in the ad. Although in this instance, the banner ad is shown as a banner ad right on the hosted web site, this clickable banner ad embodying a voupon could be on any web site so long as the merchant or advertiser were a partner of the VRCD data base hosting company 20. The voupon will be automatically organized and stored in the user database 23 by the database server 28, preferably as described in the method described with respect to FIG. 3 and the accompanying text.

A set of coupon sub-classifications are accessible by the clickable links 64 shown above the restaurant offers of FIG. 5. Just as the broader classes of VRCDs (coupons, rebates, bills, etc.) are not exhaustive, neither are these narrower categories. Shown in this example within clickable links 64 are "Restaurants, Music, Fashion, Grocery, and View All."

Also shown on FIG. 5 are clickable links 65, 66 for personal information databases (calendar 65 and contacts 66). It is the integration of these personal information databases with the VRCD information that comprises the web-based VRCD organizer or i-PIM described in this application.

Figure 6:
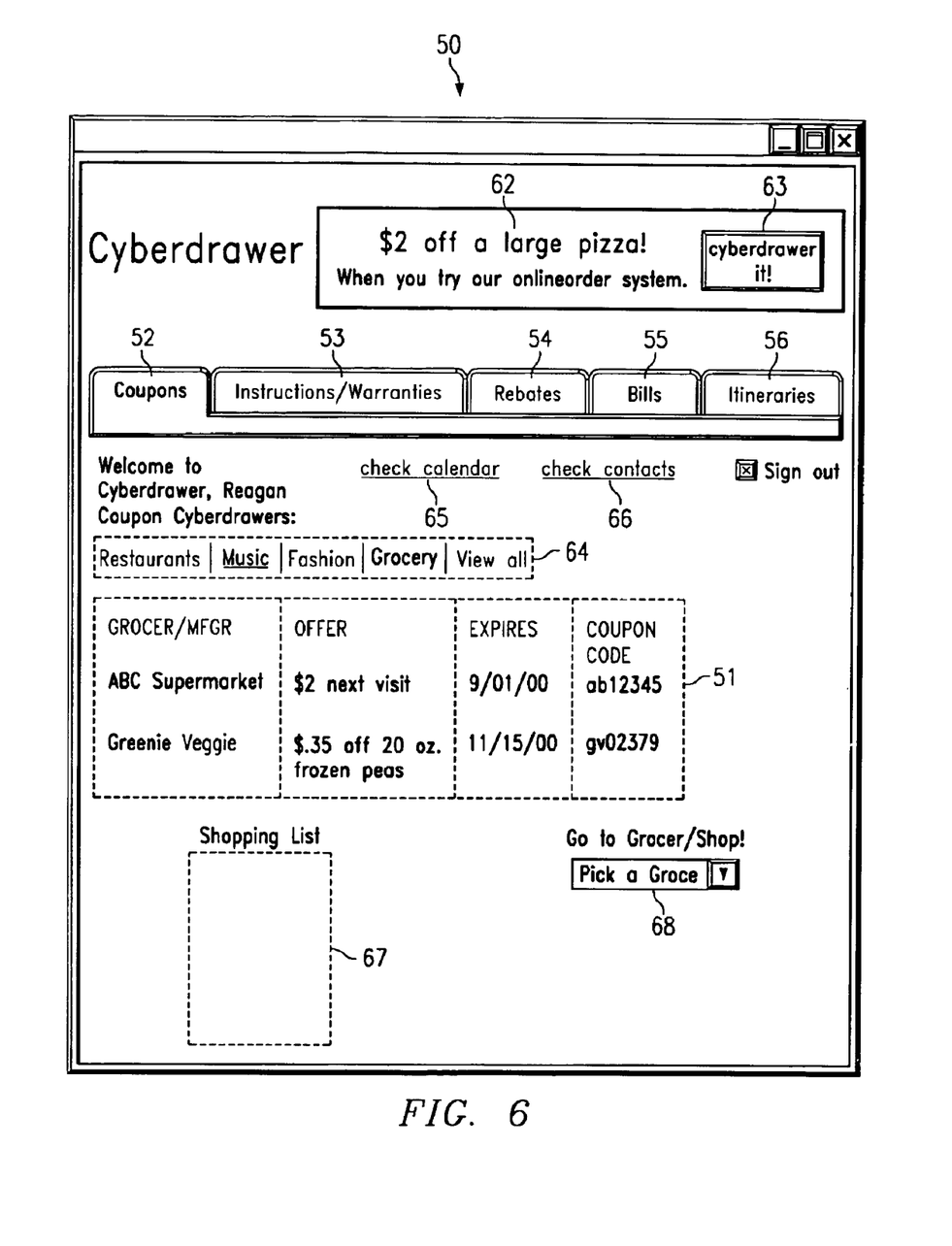
FIG. 6 is a diagram of the "Coupon: Grocery" portion of the user database as it might appear on the user's client display screen.

FIG. 6 is a screen display for the "Coupons: Groceries" category of the user's web-based i-PIM. Shown in this screen are the user's grocery manufacturer and grocery store coupons. Preferably, as shown in this figure, the consumer can also integrate his coupon preference shopping list 67 with an online grocer. The online grocer can be selected using a drop-down list 68 or other known web design technique for providing an item "selector." The consumer selects his online grocer using the drop-down list 68, and the VRCD database host then seamlessly connects the user to an affiliated online grocer to retrieve the consumer's previous shopping list from the online grocer. If the user is already at an affiliated online grocer website, that online grocer can preferably access the user's coupon preference grocery list from the VRCD database host.

When the user/customer decides to grocery shop online, he will preferably connect to the affiliated online grocer via pull-down list 68. The affiliated online grocer will then preferably have access to the user's individual VRCD database 23, enabling the user while at the online grocer's site to pull up his coupon list 51 and his grocery list 67, and proceed with his shopping. After the consumer completes his shopping, the i-PIM organizer automatically matches coupons previously clipped and collected on the user database 23 with items selected for purchase from the grocery list 67, by brand or price preference. If the user has set his shopping list coupon preference to purchase the bread at the lowest price and without brand preference, the i-PIM organizer will automatically match the coupons with the bread brands and choose the lowest price product (accounting for coupons) utilizing the server applications operating on a server within the database host. If he selected Pepsi to purchase online, and he has a brand coupon preference for soft drink, the VRCD database organizer will search only for Pepsi coupons, which it will match, if available, to the item Pepsi-brand item purchased.

What the consumer sees next are the items chosen in the grocery list 67 chosen according to the consumers' preferences. The consumer can accept all the items chosen, or individually change items and search for other coupons in the coupon organizer if he does not like the particular brand chosen. Once he has completed this step, he will then submit his purchase request. The online grocer will then contact the user database 23 to redeem the matching coupons that are stored within the user's individual database.

It is also possible to set up the user's web-based i-PIM for automatic grocery shopping by configuring the i-PIM with the user's online grocer login name and password. By doing this, the i-PIM can accept the user's shopping list 67, automatically login to the online grocer's website according to the pull-down menu selection 68, gather or select the items for purchase based on the user's brand preferences, item prices, and available coupons, and present these choices to the user at the i-PIM "Coupons: Grocery" screen described above. The user can then modify the choices and approve the selections, and the i-PIM can complete the purchase with the on-line grocer based on the user's final selection.

Figure 7:
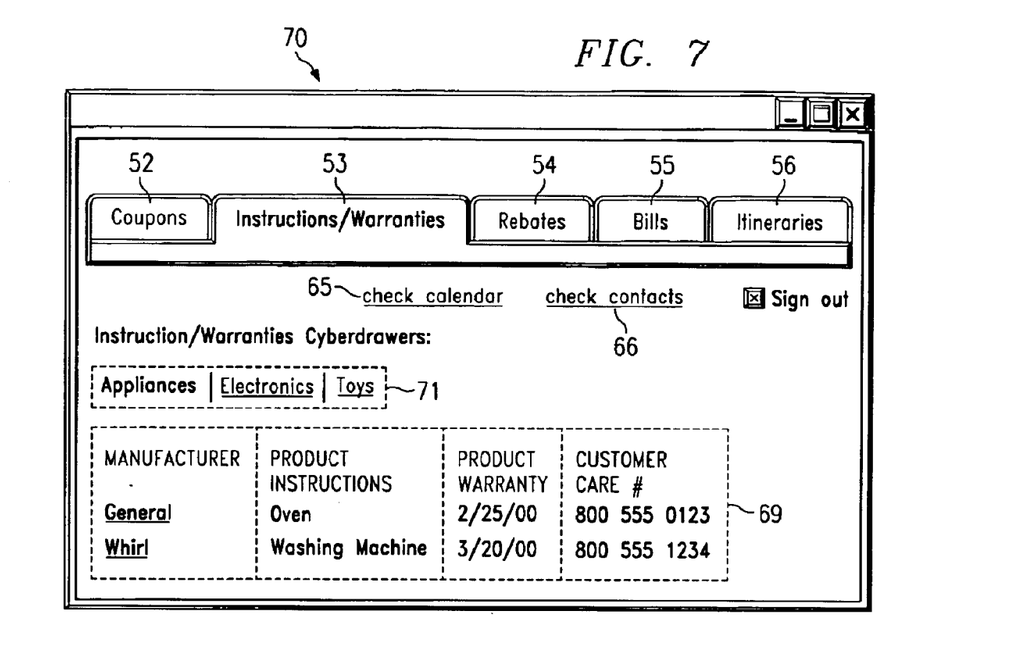
FIG. 7 is a diagram of the "Instructions/Warranties" portion of the user's individual database as it might appear on the user's client display screen.

FIG. 7 shows a screen 70 that is similar to the one provided for "Coupons: Restaurants" 50. The tabs 52, 53, 54, 55, 56 and clickable links 65, 66 shown in FIG. 7 that have the same reference numbers in FIGS. 5–6 perform the same functions as in those figure, and they will continue to perform the same functions in the subsequently-described figures. The screen 70 contains information relative to instructions and warranties that is generally analogous to the information of table 51 in the screen 50 of FIG. 5. As shown in the clickable links 71, a non-exhaustive list of product instructions/warranties in this context would include "Appliances, Electronics, and Toys." Given that there is no unique coupon ID associated with these rebates, this poses questions as to how the information for the VRCD reaches the user database 23. One approach would be to assign a unique number to each warranty or product instruction document, and then as with the unique coupon or promotional ID 43 (see FIG. 4), it would only be necessary to transmit that information to the host 20 to identify the full VRCD. Alternatively, all relevant details for identifying the product warranty or information sheet could be transmitted to the host 20 from the partner web site. One detail that would preferably be included would be a web site where the actual text of the document is stored; alternatively, the actual text of the document could be stored in the user database 23.

Figure 8:
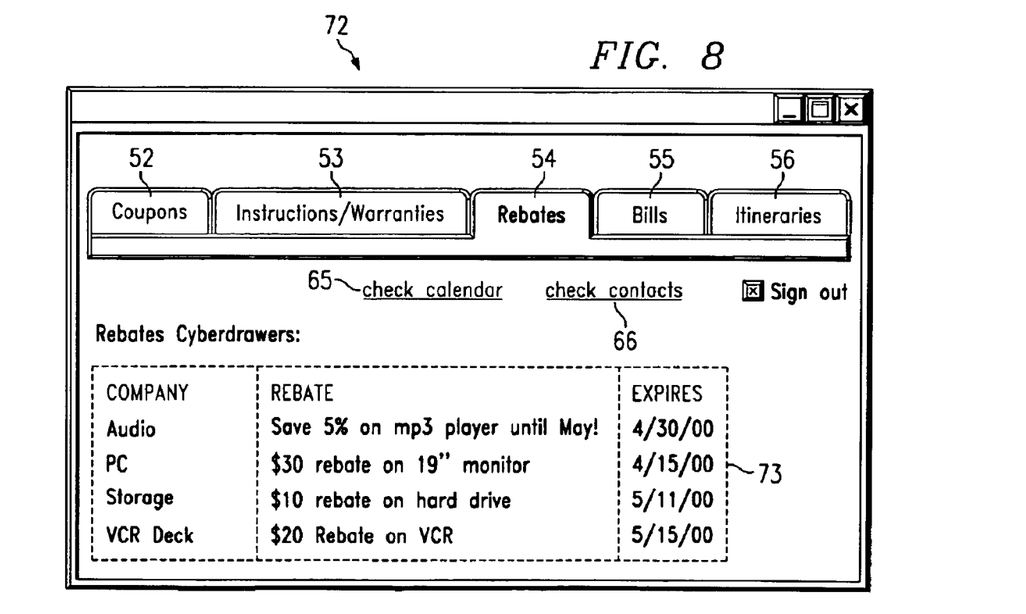
FIG. 8 is a diagram of the "Rebates" portion of the user's individual database as it might appear on the user's client display screen.

FIG. 8 is the screen shot 72 for the "Rebates" category. Although no subcategories of rebates are shown in this screen shot, the category could be divided in to subcategories according to the type of merchant or service provider the rebates relate to. The database information shown here includes the company, rebate details, and rebate expiration date. As with the product warranties and product information, there is no coupon or promotion ID which uniquely identified the elements shown here. As before, there could be assigned a hidden such ID which would be transmitted to the host 20 to specify the information to be stored, or the entire set of relevant information could be submitted each time.

Figure 9:
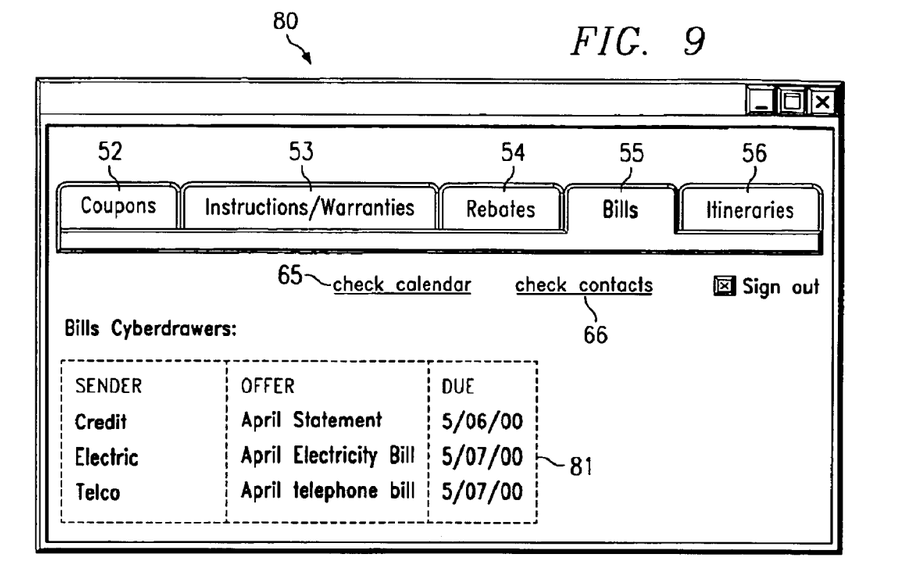
FIG. 9 is a diagram of the "Bills" portion of the user's individual database as it might appear on the user's client display screen.

FIG. 9 provides the screen shot 80 for the "Bills" category. The merchant and statement details are provided in the table 81 which will be stored in the user database 23. Preferably, the database 23 also stores the actual content of the bills or merchant statements. In this manner, the user database will act as a sort of "shoebox" for archived bills and bank and credit card statements. Here again, the "Bills" category could be divided into subcategories accessible by a click links on the page.

Preferably in the record for each statement stored in the individual VRCD database 23 and displayed on the "Bills" screen 80, there would be provided an Internet hyperlink to the merchant, bank, or credit card company website. If the user's login name and password are provided to the i-PIM, the user will be able to click directly into their online account with the respective company or the i-PIM would be able to access the merchant website directly.

Figure 10:
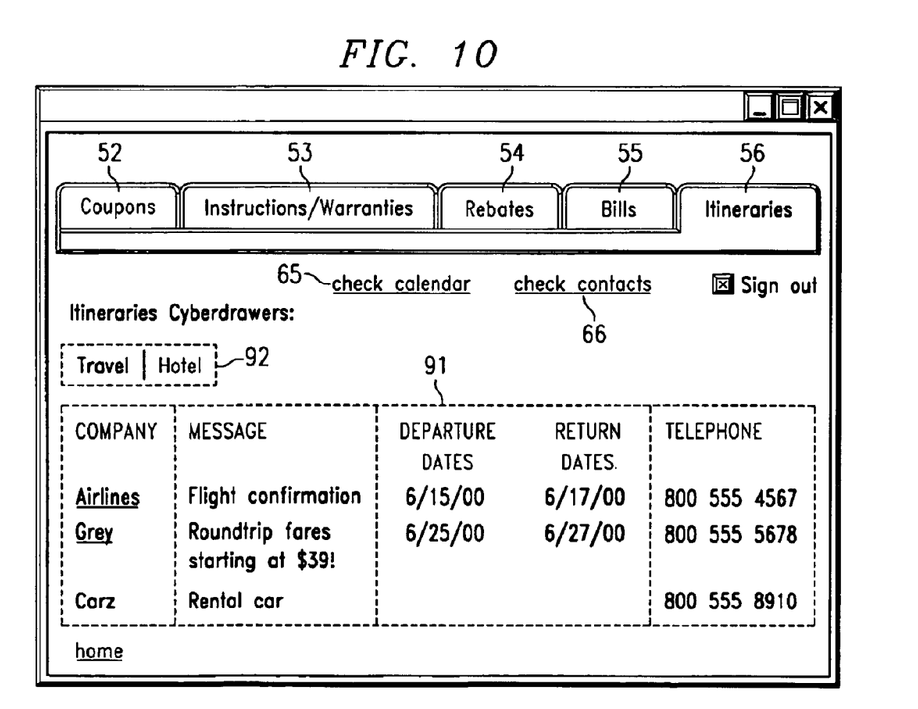
FIG. 10 is a diagram of the "Itineraries" portion of the user's individual database as it might appear on the user's client display screen.

Another exemplary screen shot is provided in FIG. 10. This screen shot 90 is for the "Itineraries" category. Subcategories for travel and hotel itineraries are provided for this category with the clickable links 92 shown. The information that will be provided to the VRCD database host 20 will typically be provided in this section by VRCDs provided to the database host 20 by airlines, travel agents, and online travel planning websites. So that the VRCD database host 20 can properly recognize and parse incoming VRCDs from these sources, the VRCD administrator will provide header and field formats to these VRCD sources whereby the sources can conform their VRCDs to the expected format. In this manner, for instance, the VRCD database host 20 can recognize that an incoming file or message is a VRCD file compatible with the i-PIM. The database host will further be able to parse the fields from the incoming VRCD according to the predetermined formats, and will thus be able to store the pertinent field information in the user's individual database 23 according to the information provided by the airline, travel agency, or travel website VRCD data source.

Thus, for example, upon setting up a trip with through an online reservation travel website, the online travel agent may send a confirmation email to the user at his i-PIM, and to this confirmation email there may be attached a VRCD from which the i-PIM can strip the relevant information such as flight numbers, departure and arrival times, confirmation numbers, and airline contact information. Similarly, the hotel contact information and address, and even a map, could be provided and stored at the user's individual database 23. This information would be automatically parsed and categorized in the appropriate subsection of the user's individual database 23.

Figure 11:
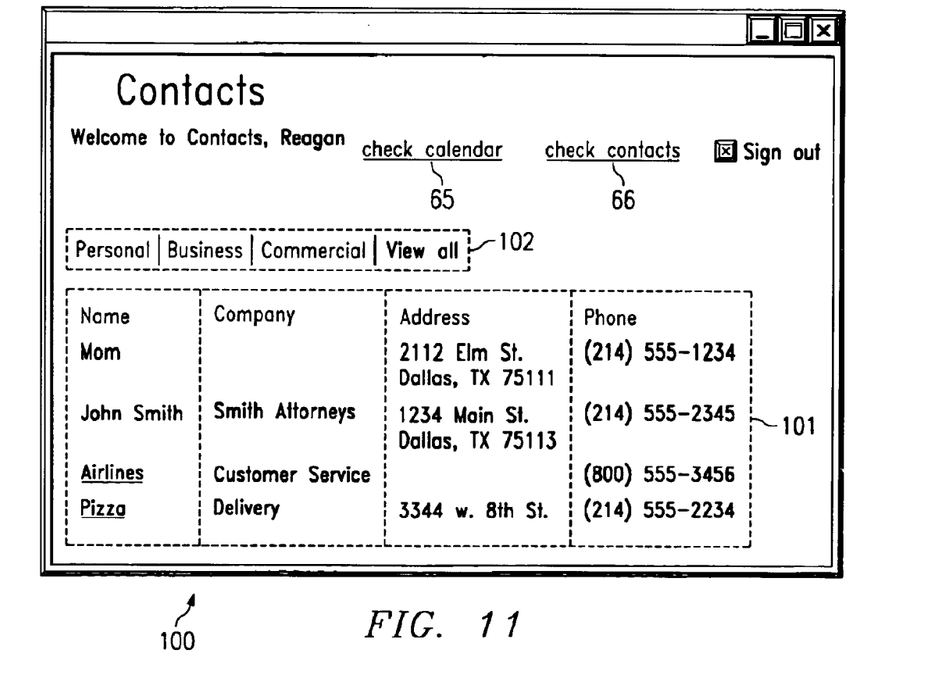
FIG. 11 is a diagram of the "Contacts" portion of the user's individual database as it might appear on the user's client display screen.

FIG. 11 is an exemplary screen shot 100 of the contact manager of the user's 19 web-based integrated-PIM or i-PIM. "Personal," "Business," and "Commercial" subgroups are provided in the contact manager by clickable links 102. The table 101 shows an exemplary set of information that is associated with each of the entries of the contact manager. A feature that is illustrated by this embodiment is the feature of the VRCDs in other categories also providing information that is useful for the i-PIM's contact manager and calendar. For example, there are entries 103, 104 in the table both for an airline and for a pizza delivery company. In one embodiment, these entries were completed when a VRCD for another category such as "Bills," "Coupons," or "Itineraries" had been received which also included contact information for the merchant or service provider associated with the bill, coupon or itinerary. For example the entry 103 shown here for "Bills" may be automatically created with the receipt of a pizza coupon, and thereby a contact list entry is created having the address and phone number for the pizza delivery company. As another example, the entry 104 may be automatically created with the receipt of an itinerary VRCD. Integrated functions like this help the user to keep up with or manage his or her resources effectively.

Figure 12:
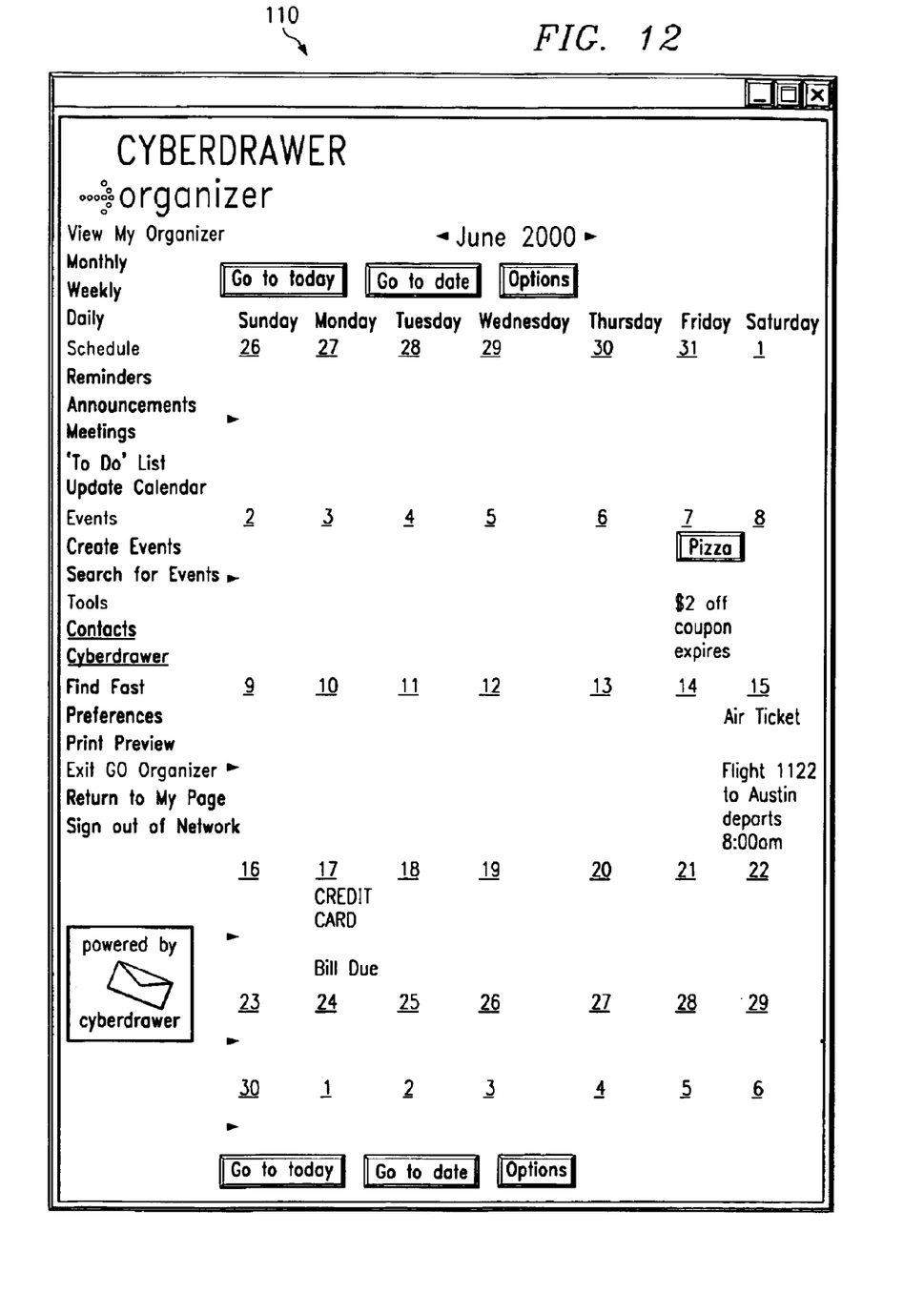
FIG. 12 is a diagram of the "Calendar" portion of the user's individual database as it might appear on the user's client display screen.

FIG. 12 similarly shows in a screen shot 110 the calendar function of the i-PIM. Here, along with the user's normal calendar, other calendar entries can be automatically generated by the receipt of VRCDs. This calendar can be provided at a website hosted by the VRCD host 20, and accordingly the user could go directly to that website to maintain his personal calendar. The software for the online calendar can be provided on the i-PIM website server, or it can be provided through a calendar-hosting service. Internet portals often act as calendar hosts, sometimes from their own sites directly and sometimes through a company that specializes in online calendar software development and hosting, such as eCal, Inc. Examples of the features that can be provided through these online calendar services are described in U.S. Pat. No. 5,960,406 for Scheduling System for Use Between Users on the Web, to Rasansky, et al.

Within the present application, it is disclosed that such online calendars can be automatically updated with important dates according to the VRCDs that have been received and categorized by the VRCD database host 20. For example, upon receipt of a coupon, the expiration date for the coupon can automatically be registered on the user's personal online calendar. Preferably, the user may set a certain threshold value of the coupon, $10 for instance, before the expiration date of that coupon is noted on the online calendar. Other types of received and categorized VRCDs often have important dates associated with them, which would preferably be automatically noted on the user's online calendar.

For instance, it may be useful to automatically update an online calendar with a maintenance schedule when certain types of product instruction VRCDs are received. Examples of such types of products might be battery replacements dates for smoke detectors and maintenance schedules for automobiles. By providing the header and field information for such instruction VRCDs to the product vendors, the VRCD database administrator can ensure that this information can be automatically parsed from the VRCDs and updated to the user's online calendars. Similarly, rebate expiration dates can be automatically culled from "Rebate" VRCDs and updated to the user's online calendars, and bill due dates can be extracted from "Bill" VRCDs and noted on the user's online calendars. Also, flight arrival and departure information can be pulled from "Itinerary" VRCDs by providing specified VRCD header and field formats to the airlines, travel agents, and online travel planning sites.

In those instances where the user's online calendar is maintained elsewhere than the VRCD database host 20 (i.e., the online calendar access may be provided through a dropdown menu on the i-PIM calendar page 110), the VRCD organizer still provides for automatic updating of the user's calendar by receiving from the user the username and password by which to access the online calendar. With this username and password, the i-PIM organizer can be programmed, preferably through one of the servers resided in the VRCD database host 20, to access and update the user's online calendar.

Although the various methods described herein have been described for implementation in a general purpose computer selectively activated or reconfigured by software, one of ordinary skill in the art would also recognize that such methods may be carried out in hardware, in firmware, or in more specialized apparatuses constructed to perform the methods.

Further, as used herein, a "client" should be broadly construed to mean any computer or component thereof directly or indirectly connected or connectable in any known or later-developed manner to a computer network, such as the Internet. A "client" should also be broadly construed to mean one who requests or gets the file, and the "server" is the entity which downloads the file.

What is claimed is:

1. A method of managing virtual documents associated with a plurality of enterprises on behalf of a plurality of consumers, wherein a given virtual document comprises data associating it with one of the consumers and with one of the enterprises, the method comprising:
   a) establishing a network database on a network-connected computer, said network database corresponding to a plurality of consumers, the network database having data records and comprising a set of categories wherein one of the categories is an enterprise identifier category;
   b) receiving a first one of said virtual documents at said network-connected computer from a first document source;
   c) identifying a first consumer corresponding to the first received virtual document and identifying a first enterprise associated with the first received virtual document;
   d) storing information from the first received virtual document within the network database in a first data record associated with the first identified consumer, wherein the stored information includes the first enterprise identification stored in the enterprise identifier category in the first data record;
   e) receiving a second one of said virtual documents at said network-connected computer from a second document source that is different from the first document source;
   f) identifying a second consumer corresponding to the second received virtual document and identifying a second enterprise associated with the second received virtual document, the second consumer being different from the first consumer; and
   g) storing information from the second received virtual document within the network database in a second data record associated with the second identified consumer, wherein the stored information includes the second enterprise identification stored in the enterprise identifier category in the second data record.

2. The method of claim 1 wherein at least one of said consumers accesses the Internet through interactive television.

3. The method of claim 1 wherein at least one of said consumers accesses the Internet through a mobile phone.

4. The method of claim 1 wherein the first and second document sources are selected from the group consisting of: a merchant; an on-line merchant; a distributor, an advertiser; a remote network-connected computer operating upon a request from an individual user; and an individual consumer forwarding an e-mail comprising a virtual document.

5. The method of claim 4 wherein said individual consumer requested said virtual document at the remote network-connected computer by clicking on a banner ad displayed at the remote network-connected computer.

6. The method of claim 5 wherein said individual consumer requested said virtual document by clicking on a button within said banner ad.

7. The method of claim 4 wherein said individual consumer requested said virtual document from the remote network-connected computer by clicking on a button within an e-mail received by said individual consumer.

8. The method of claim 1 wherein at least one of said virtual documents is selected from the group consisting of: merchant coupons, product warranties, sales receipts, product instructions, service instructions, rebates, gift certificates, product registration cards, event tickets, credit card statements, bank statements, and recipes.

9. The method of claim 1 further comprising storing at least one online website username and password in said network-connected computer for accessing websites that are protected by that online website username and password.

10. The method of claim 1 wherein at least one of the first and second enterprises is an individual.

11. A database host for managing virtual documents associated with a plurality of enterprises on behalf of a plurality of consumers, wherein a given virtual document comprises data associating it with one of the consumers and with one of the enterprises, the database host connected to a network and comprising:
   a) a network database corresponding to a plurality of consumers, the network database having data records and comprising a set of categories wherein one of the categories is an enterprise identifier category;
   b) a network interface connected to said network, the network interface configured to receive electronic messages comprising said virtual documents;

c) a main server and associated software connected to said network interface and configured to receive a first one of said virtual documents from a first document source, to identify a first consumer corresponding to the first received virtual document, to identify a first enterprise associated with the first received virtual document, and to parse into first information elements a first of said data records associated with the first identified consumer;

d) said main server and associated software further configured to receive a second one of said virtual documents from a second document source that is different from the first document source, to identify a second consumer that is different from the first consumer corresponding to the second received virtual document, to identify a second enterprise associated with the second received virtual document, and to parse into second information elements a second of said data records associated with the second identified consumer; and e) a database manager connected to said network database and said main server, said database manager configured to receive said first and second information elements parsed by said main server and to store said first and second information elements in categories in the network database in the first and second data records, respectively, according to parsing instructions from the main server, wherein the stored first and second information elements include the first and second enterprise identification stored in the respective enterprise identifier categories in the first and second data record.

12. The database host of claim 11 wherein at least one of said consumers accesses the Internet through interactive television.

13. The database host of claim 11 wherein at least one of said consumers accesses the Internet through a mobile phone.

14. The database host of claim 11 wherein said network interface, said main server, and said database manager are all processes running on a single server unit.

15. The database host of claim 11 wherein at least one of said virtual documents is selected from the group consisting of: merchant coupons, product warranties, sales receipts, product instructions, service instructions, rebates, gift certificates, product registration cards, event tickets, credit card statements, bank statements, and recipes.

16. The database host of claim 11 wherein said electronic messages further include consumer preference information from said first and second consumers.

17. The database host of claim 16 wherein said consumer preference information includes a username that the first or second consumer uses to login to web-based applications on at least one computer connected to said network.

18. The database host of claim 11 and further comprising a web server connected to said main server and configured to display web pages accessible by said at least one computer.

19. The database host of claim 18 wherein said web server is a software process running on the same server unit as said main server.

20. The database host of claim 11 wherein at least one of the first and second enterprises is an individual.

* * * * *